(12) United States Patent
Thomas et al.

(10) Patent No.: US 9,586,344 B2
(45) Date of Patent: Mar. 7, 2017

(54) METHOD AND SYSTEM OF FORMING A RELEASABLE SUPPORT AND METHOD OF PRE-CURE REMOVAL OF A COMPOSITE LAMINATE

(71) Applicant: The Boeing Company, Chicago, IL (US)

(72) Inventors: Charles W. Thomas, Issaquah, WA (US); Derek J. Flolid, Bothell, WA (US); John D. Morris, Seattle, WA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 14/476,332

(22) Filed: Sep. 3, 2014

(65) Prior Publication Data

US 2016/0059443 A1    Mar. 3, 2016

(51) Int. Cl.
| | | |
|---|---|---|
| *B29C 65/48* | (2006.01) | |
| *B29C 65/52* | (2006.01) | |
| *B32B 37/10* | (2006.01) | |
| *B32B 37/12* | (2006.01) | |
| *B32B 37/26* | (2006.01) | |
| *B32B 38/10* | (2006.01) | |
| *B32B 38/18* | (2006.01) | |
| *C08J 5/12* | (2006.01) | |
| *C09J 5/06* | (2006.01) | |
| *B29C 33/68* | (2006.01) | |
| *B29C 70/34* | (2006.01) | |

(52) U.S. Cl.
CPC ............ *B29C 33/68* (2013.01); *B29C 70/342* (2013.01)

(58) Field of Classification Search
USPC ......... 156/247, 249, 285, 289, 307.1, 307.3, 156/307.4, 307.7, 494, 537, 538, 540, 156/580, 581
See application file for complete search history.

(56) References Cited

U.S. PATENT DOCUMENTS 4,407,685 A * 10/1983 Hankland ........... B29C 37/0028
                                                                156/212
5,292,475 A *  3/1994 Mead .................... B29C 37/005
                                                                264/257

(Continued)

FOREIGN PATENT DOCUMENTS

EP          0271263         6/1988

*Primary Examiner* — Sing P Chan
(74) *Attorney, Agent, or Firm* — McDonnell Boehnen Hulbert

(57) ABSTRACT

A method and system of preparing a releasable underlying support for use in preparing a composite laminate is presented where a base tool is a covered with a conformable thin sheet on the tooling surface of a base tool, where the thin sheet is configured with one high tack surface side and an opposite side having a non-tack surface in contact with the tooling surface. The non-tack surface side will allow release of laid up pre-cure composite lamina that can then be cured on a separate curing tool. The thin sheet is positioned over the base tool and a vacuum source and sealed around the perimeter edge of the base tool. Drawing a vacuum causes the non-tack surface side of the film to be drawn downward into contact with the tooling surface. Plies of pre-cure lamina can then be added to the base tool covering and adhering to the high tack surface side.

22 Claims, 5 Drawing Sheets

(56) References Cited

U.S. PATENT DOCUMENTS

| | | | |
|---|---|---|---|
| 6,276,044 B1 * | 8/2001 | Ragland | B21D 13/00 29/521 |
| 8,551,380 B2 | 10/2013 | Hawkins et al. | |
| 2012/0121866 A1 * | 5/2012 | Hawkins | B29C 70/30 428/174 |

* cited by examiner

METHOD AND SYSTEM OF FORMING A RELEASABLE SUPPORT AND METHOD OF PRE-CURE REMOVAL OF A COMPOSITE LAMINATE

TECHNICAL FIELD

This disclosure generally relates to systems and processes for forming a releasable support over a base tool for use in preparing a laminate composite and systems and methods to prepare a laminate composite using the releasable support where the composite laminate is easily removed from the base tool.

BACKGROUND

Fabricating composite parts, for example a ply-by-ply airplane wing stringer, requires the use of a lay-up tool (also known as a base tool) on which layers of composite pre-preg materials or pre-cure lamina are formed one ply at a time. Once the desired numbers of layers are placed on the base tool, the composite laminate is then removed and placed on a cure tool for final assembly, consolidation, and curing in a curing apparatus, such as an autoclave. Removal of the composite laminate from the base tool can present challenges in that the inherently sticky composite pre-preg materials tend to adhere or stick to the base tool surface. When this occurs, the removal of the composite may require the use of force that can impact the quality of the still uncured composite laminate resulting in a loss of product and increased production times and costs.

In an effort to avoid the issues that can arise during the removal of a composite laminate from a base tool, some fabricators apply the composite plies directly onto a cure tool, thus avoiding the need for removal of the pre-cure composite lamina before the curing operation is performed. Unfortunately, cure tools are generally much heavier than base tools making it difficult to relocate the cure tool with the attached composite laminate from the layup assembly area to the curing apparatus. Cure tools are also typically more expensive and in limited supply as compared to base tools, which therefore greatly increases the fabrication time and costs.

There has been limited success with use of release films applied to the base tool because these films have inherently low tack properties and do not provide a stable and secure surface for the layup of the plies of composite pre-preg material. This can result in slower than desired laydown rates and an increase in scrapped parts.

Accordingly, there is a need for systems and methods of laying up composite plies over a base tool that allows each ply to be deformed as it is applied to the tool in order to closely conform the ply to the tool contours while the ply remains accurately positioned. Once a composite lamina is formed on the base tool, the final composite laminate can be removed from the base tool without damage.

SUMMARY

The disclosed embodiments provide a method of forming a releasable underlying support for use in the preparation of a composite laminate that is eventually finished to make an airplane wing stringer. The method involves providing a base tool having a tooling surface and a perimeter edge, placing a conformable thin sheet on the tooling surface, where the thin sheet is configured with one high tack surface side and an opposite side having a non-tack surface in contact with the tooling surface. The thin sheet is positioned over a vacuum source, the thin sheet is then sealed at or near the perimeter edge of the tool, and a vacuum is drawn to cause the non-tack surface side of the thin sheet to be drawn downward into contact with the tooling surface.

According to another embodiment, a method of forming a composite laminate is described that involves providing a base tool having a tooling surface and a perimeter edge, where a conformable thin sheet is placed on the tooling surface. The thin sheet is preferably configured with one high tack surface side and an opposite side having a non-tack surface, where the non-tack surface side is placed in contact with the tooling surface. The thin sheet is positioned over a vacuum source and sealed at or near the perimeter edge of the tool. A vacuum is drawn to cause the non-tack surface side of the sheet to be drawn downward into contact with the tooling surface, and then a first layer of pre-cure lamina (i.e., pre-preg) is applied to the high tack surface side of the thin sheet. Additional layers or plies of pre-cure lamina can be added to the first layer to eventually form the composite laminate. The vacuum is stopped and the seal from the thin sheet is removed. The composite laminate and thin sheet are removed from the base tool and the thin sheet is removed from the composite laminate before composite laminate is placed on a curing tool for subsequent finishing steps.

According to yet another embodiment, a system of forming a composite laminate comprises a base tool comprising a tooling surface and a perimeter edge. A conformable thin sheet is laid up over the tooling surface, where the conformable thin sheet is configured with one high tack surface side and an opposite side having a non-tack surface in contact with the tooling surface. A vacuum source is operatively coupled to the thin sheet; and at least one seal provided at or near the perimeter edge of the tool thereby providing a seal to the thin sheet. Wherein the vacuum source is operated to draw a vacuum, thereby causing the non-tack surface side of the sheet to be drawn downward into contact with the tooling surface.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

Figure 1:
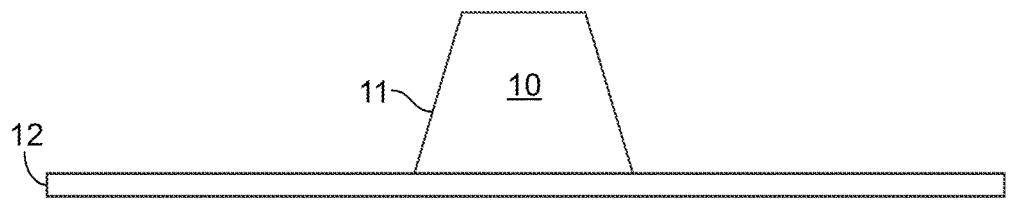
FIG. 1 is a schematic illustration of a side view of a base tool.

A first step common to the processes described in connection with various embodiments of the invention described here involves providing a suitable base tool, otherwise known as a lay-up tool. Existing base tools can be used or in some circumstances a base tool is fabricated to represent the tooled surface of the desired part, for example an airplane wing stringer or other primary or secondary structures, namely, I-beams, hat-stiffeners, C-channels, stiffeners, blade-stiffeners, floor-beams, ribs, frames, or spars. Fabrication and/or construction of base tools are known to those skilled in the art and therefore such details do not need to be repeated here. Referring to FIG. 1, a base tool 10 is in position in a laying up location 12. The base tool has a tool surface 11 generally facing upwards and away from the tool surface 11. The orientation of the tool surface, of course, is a function of the complexity and contours of base tool itself.

Figure 2:
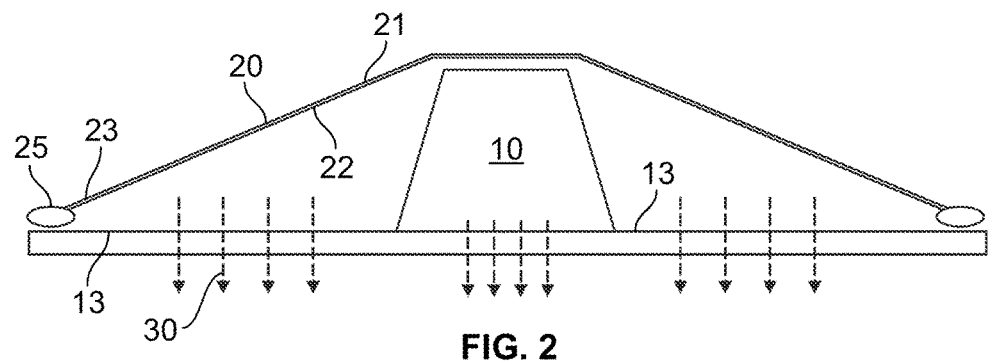
FIG. 2 is an illustration of the base tool of FIG. 1 with a conformable thin sheet placed over the tool and sealed around the perimeter edge of the tool.

Once the base tool is in a ready position, a conformable thin sheet 20 is placed over the base tool as illustrated in FIG. 2. The thin sheet 20 has a smooth surface side 22 and a tacky, sticky or high tack side 21. The sheet may comprise, for example and without limitation, a latex rubber or similar natural or synthetic deformable material having a thickness suitable for the application. Preferably, the conformable thin sheet 20 is of a composition that is acceptable to be used in contact with uncured pre-preg material. For example, such a conformable thin sheet 20 is preferably selected so as not to adversely affect the resin content and/or resin-to-fiber ratio of the lamina 40. Most preferably the sheet 20 is fabricated from materials that will allow the application of a vacuum to the smooth side 22 to cause the sheet to be drawn down and around the tool 10 conforming to the shape and contours of the tool surface 11.

In one preferred arrangement, the thin sheet 20 comprises a first and a second layer wherein one surface of the first layer is adhesively bonded to the second layer. More preferably, the first layer comprises a thin latex layer comprising a thickness in the range of approximately 0.01 inch, plus or minus 0.005 inches. The second layer may comprise a stretch material. For example, such stretch material may comprise either a one-way or a two way stretch material. As just one example, such stretch material may comprise LYCRA® fiber, a man-made elastane fiber, and may be used because of its unique stretch and recovery properties. Such a stretch material may have a thickness in the range of 0.01 inches, plus or minus 0.005 inches.

Figure 3:
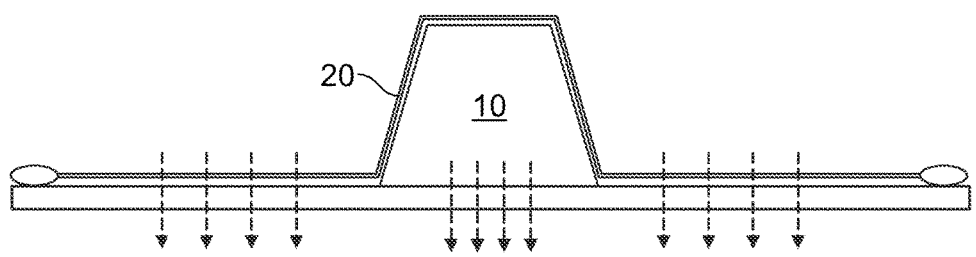
FIG. 3 is an illustration of the set-up of FIG. 2 with a vacuum applied to the conformable thin sheet.

Once the thin sheet 20 is placed over the tool surface 11, the end portions 23 are sealed with seal 25, which preferably comprises a butyl rubber or other common vacuum bag sealant tape applied to both the tool perimeter and the underside of the thin sheet 20. Alternatively, an elastomer blade seal could be used to provide a reusable and easily releasable seal. The seal 25 holds end portions 23 of the thin sheet 20 at or near the perimeter edge 13 of the base tool 10 in such a manner that when a vacuum is drawn in the direction of arrows 30 this causes the thin sheet 20 to be drawn downward such that the non-tack surface side 22 of sheet 20 conforms to the shape of the tool surface 11 as illustrated in FIG. 3. Although a number of methods can be used to draw a vacuum to cause the thin sheet to conform to the shape of the tool surface, a preferred approach is to operatively couple a vacuum source to the thin sheet 20 in a known manner so as to operate the vacuum source and draw or pull a vacuum through channels located on an underside of the base tool. These channels would be in fluid communication with holes or other orifices extending upwards within an area inside a perimeter defined by seal 25. In some circumstances, vacuum can be transported using a nylon tube bag having a breather material inside. Also, in some cases, depending on the design and/or shape of the base tool, small holes or orifices can be used to provide a fluid evacuation flow path from the tool surface 11 to an inside or hollow portion of the base tool. These holes allow the thin sheet 20 to be drawn down more tightly around the tool surface 11, especially if the tool is very contoured.

Figure 4:
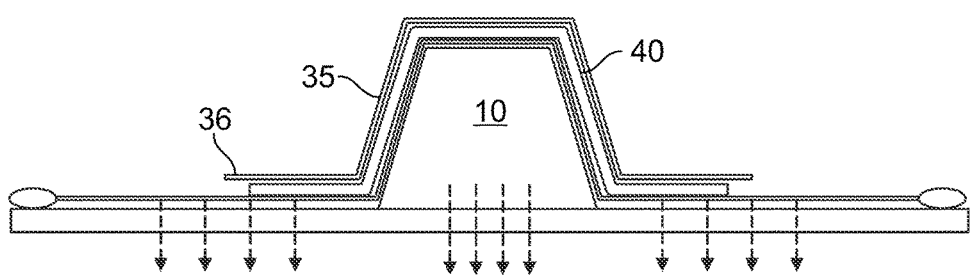
FIG. 4 is an illustration of the set-up of FIG. 3 with a first layer of pre-cure lamina on a deformable carrier film is applied to the high tack side of the conformable thin sheet.

At this stage in the process, with the vacuum drawn and the thin sheet 20 pulled down around the base tool, a first pre-cure lamina layer 40 is placed over the thin sheet 20 as illustrated in FIG. 4, where pre-cure lamina will contact the high tack surface side 21 of thin sheet 20. The pre-cure lamina will adhere to the thin sheet 20 because of the tackiness of the uncured resin in the pre-cure lamina 40, however additional tackifiers may be used to provide the necessary adherence between the pre-cure lamina and the thin sheet 20. Following placement of the pre-cure lamina on the thin sheet, the pre-cure lamina 40 may be compacted against the thin sheet to assure that the pre-cure lamina adheres to the thin sheet and is substantially free of buckling, wrinkles or other irregularities. The pre-cure lamina 40 can also be conformed by hand to the shape of the tool surface 11.

The pre-cure lamina 40 preferably is a pre-preg or pre-impregnated composite of fibers, where a matrix material, such as epoxy, is already present. The fibers often take the form of a weave and the matrix is used to bond them together and to other components during manufacture. The matrix is only partially cured to allow easy handling. This is known as a B-Stage material and requires cold storage to prevent complete curing. B-Stage pre-preg is always stored in cooled areas since heat accelerates complete polymerization. Composite structures or pre-cure lamina built of multiple plies of pre-pregs will typically require an oven or autoclave to cure the composite structure.

Preferably a deformable carrier film 35 is used to support the first ply of pre-cure lamina 40 during the layup process in order to prevent the ply from wrinkling and/or buckling as it is being laid up. Use of the carrier film allows the pre-preg ply to be accurately positioned and uniformly deformed as needed to conform to contoured tool surfaces. The deformable carrier film 35 may also be used to stabilize the composite ply or pre-cure lamina during handling and transporting. The method may eliminate the need for the use of slit tape, as well as extensive hand working, darting, cutting, and splitting during ply layup. The method may also increase laydown rates of composite material and may facilitate automation of the layup process. Further, the method may improve the accuracy of ply boundaries and provide more uniform deforming of ply material when required, resulting in improvements in both the strength and appearance of cured composite parts.

The pre-preg or pre-cure lamina 40 may be placed on the carrier film 35 so as to leave one or more edge margins 36 on the film 35 around the pre-cure lamina 40 to facilitate handling of the carrier film 35 and/or attachment of hardware or equipment (not shown) to the carrier film that may be used to deform, manipulate and/or hold the carrier film during the layup process. In one preferred arrangement, the lamina 40 may be laid up manually or by hand. In an alternative arrangement, the lamina 40 may be laid up using advanced fiber placement ("AFP") or automated tape laying ("ATP") manufacturing methods (or by any other known method) in the desired positions and orientations as determined during the composite laminate specification and design phase (See, e.g., FIG. 12 Step 132). The carrier film 35 allows pre-cure lamina 40 to be deformed to fit different contours and shapes of tool 10. The carrier film 35 can also be useful for controlled and uniform or non-uniform deforming of pre-cure lamina 40 before the lay-up process, and may also be used only as a carrier for transporting the lamina 40 from an offline layup station (not shown) to the base tool 10. As used herein, "deform" and "deforming" refer to stretching and/or shearing of a ply material in one or more directions, including simple and compound curves, and within one or more planes.

Figure 5:
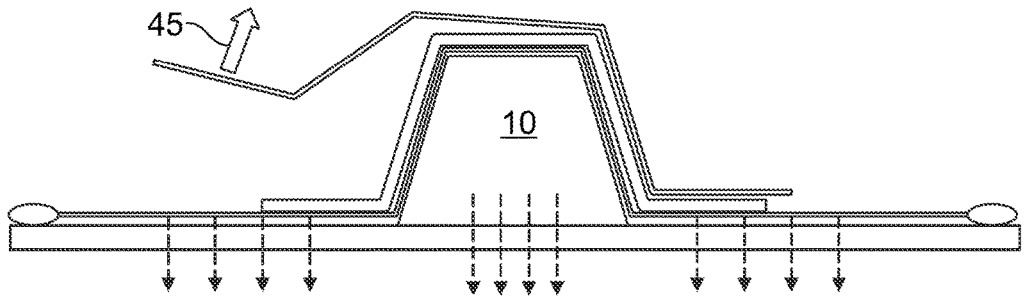
FIG. 5 is an illustration of the set-up of FIG. 4 where the deformable carrier film is being removed from the first layer of pre-cure lamina.
Figure 6:
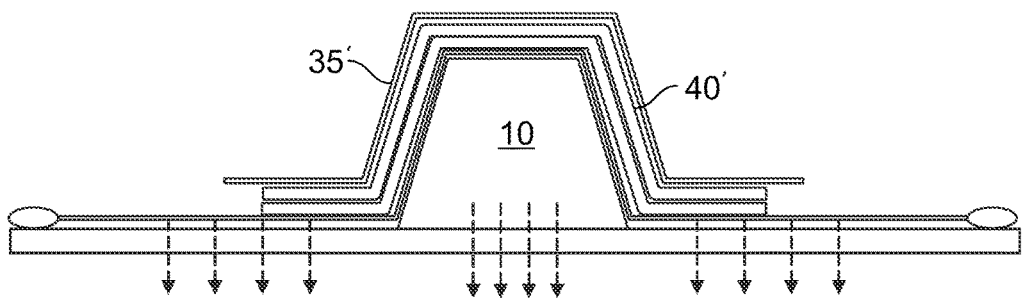
FIG. 6 is an illustration of the set-up of FIG. 5 where a second layer of pre-cure lamina is added to the first layer.
Figure 7:
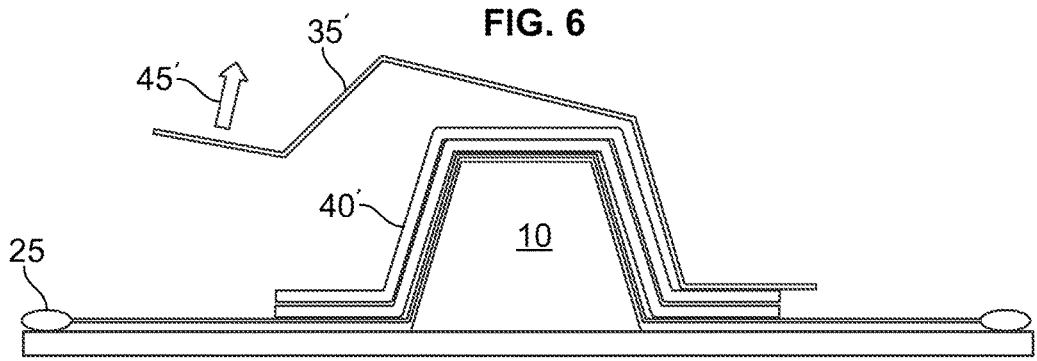
FIG. 7 is an illustration of the set-up of FIG. 6 where the deformable carrier film on the second layer of pre-cure lamina is being removed.

Once the pre-cure lamina 40 is conformed to the thin sheet 20 and surface 11 of tool 10, the deformable carrier film 35 is removed, such as by peeling it away from the pre-cure lamina as illustrated by directional arrow 45 in FIG. 5. At this point a second layer or ply of pre-cure lamina 40' can be added directly to the first layer of pre-cure lamina 40. Again, a carrier film 35' can be used to assist in the lay-up process. Once the second layer of pre-cure lamina 40' is conformed the carrier film 35' is peeled off in direction 45' as illustrated in FIG. 7. This process can be repeated as many times as required to add as many layers of pre-cure lamina as needed to build the desired composite part. The design requirements of the final part will dictate the type, composition and number of pre-cure lamina needed. When all the required layers of pre-cure lamina have been added, the vacuum is stopped. This can occur before or after the last of the deformable carrier film is removed from the formed composite laminate 48. The seals 25 are then removed to free the thin sheet 20 from perimeter 13 of tool 10.

Figure 8:
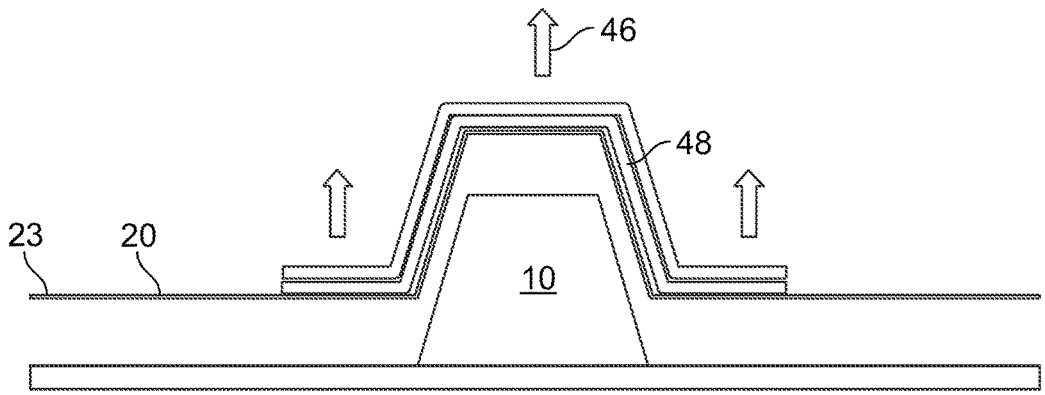
FIG. 8 is an illustration of the set-up of FIG. 7 where the composite laminate and attached thin sheet is being removed from the base tool.
Figure 9:
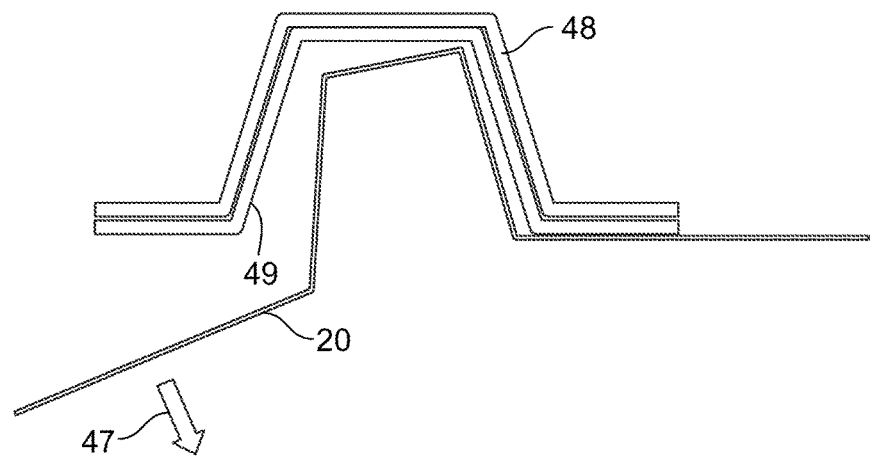
FIG. 9 is an illustration of the set-up of FIG. 8 where the thin sheet is being removed from the composite laminate.
Figure 10:
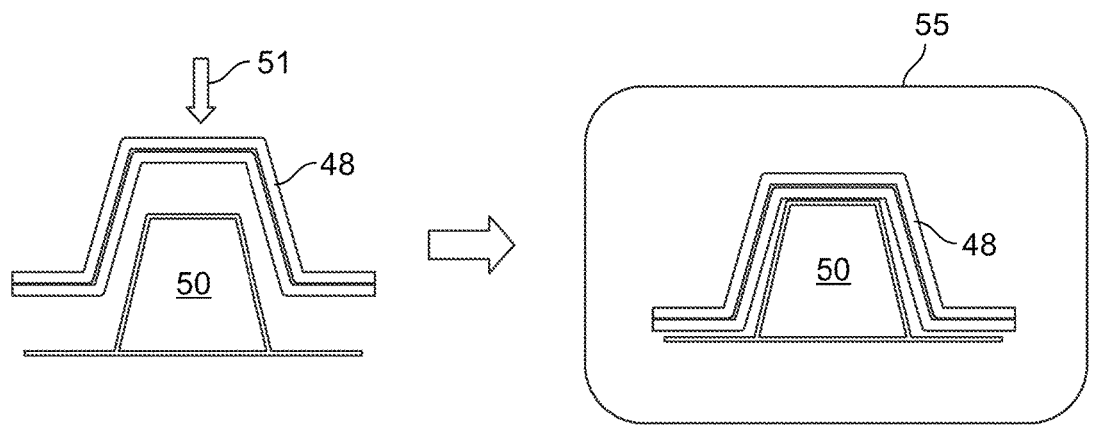
FIG. 10 is an illustration of the composite laminate being positioned on a curing tool and then placed into a curing apparatus.

The multiple ply or composite laminate 48 is then removed from tool 10 with the attached thin sheet 20 as illustrated in FIG. 8 in the direction 46. Thin sheet 20 may assist in the removal from tool 10 by grasping and/or pulling along edges 23 of the thin sheet 20. Removal of the multiple ply or composite laminate 48 may be achieved manually. Alternatively, removal may be accomplished in an automated manner with mechanical assistance or with other known manufacturing methods that utilize hands-free methods, such as by use of robotic manipulators. Once the composite laminate 48 and attached thin sheet 20 are removed from base tool 10, the thin sheet 20 is removed in the direction 47 from an inside surface 49 of the composite laminate 48. This is illustrated in FIG. 9. After removal of the thin sheet 20, the composite laminate 48 can be placed on a curing tool 50 and sent to a curing apparatus 55, for example, an autoclave, as illustrated in FIG. 10. The removed thin sheet 20 can be discarded or preferably reused to fabricate another composite laminate.

In some applications, it may be possible to use the carrier films 35, 35' to pre-position and place additional items of a layup assembly on base tool 10, such as without limitation, doublers, release films, and caul plates, along with the lamina 40, 40'. For example a composite doubler can be sandwiched between the lamina and the carrier film. Similarly, a strip of release film can be sandwiched between the lamina and the carrier film along the edge margin on the film. This release film may aid in releasing and peeling the carrier film away from the laid up lamina. It may also be possible to employ a reinforcement in the layer of pre-cure lamina which allows some degree of deforming of the lamina, but less than other, non-reinforced areas. The reinforcement may comprise, for example and without limitation, cross-stitching in the lamina.

The layers of pre-preg or lamina can be applied to the deformable carrier film either manually, or using automated equipment to lay down courses of pre-preg material in side-by-side, possibly substantially abutting relationship on the carrier film. The laid-up pre-preg material, including any doublers and/or release films is compacted against the deformable carrier film. This compaction may be performed mechanically with a hand sweep (not shown) or using a vacuum either with or without the application of heat. The carrier film 32 is then deformed in at least one direction, thereby deforming the pre-preg to the desired shape and/or dimensions best suited for the eventual layup on the base tool, including the shape and topography of the tool. At this point the pre-cure lamina layer or ply is ready to be positioned on the thin sheet covering the base tool. The carrier film can be used to position and layup the pre-cure lamina onto the tool. Once the carrier film is peeled off it can be reused or discarded.

Figure 11:
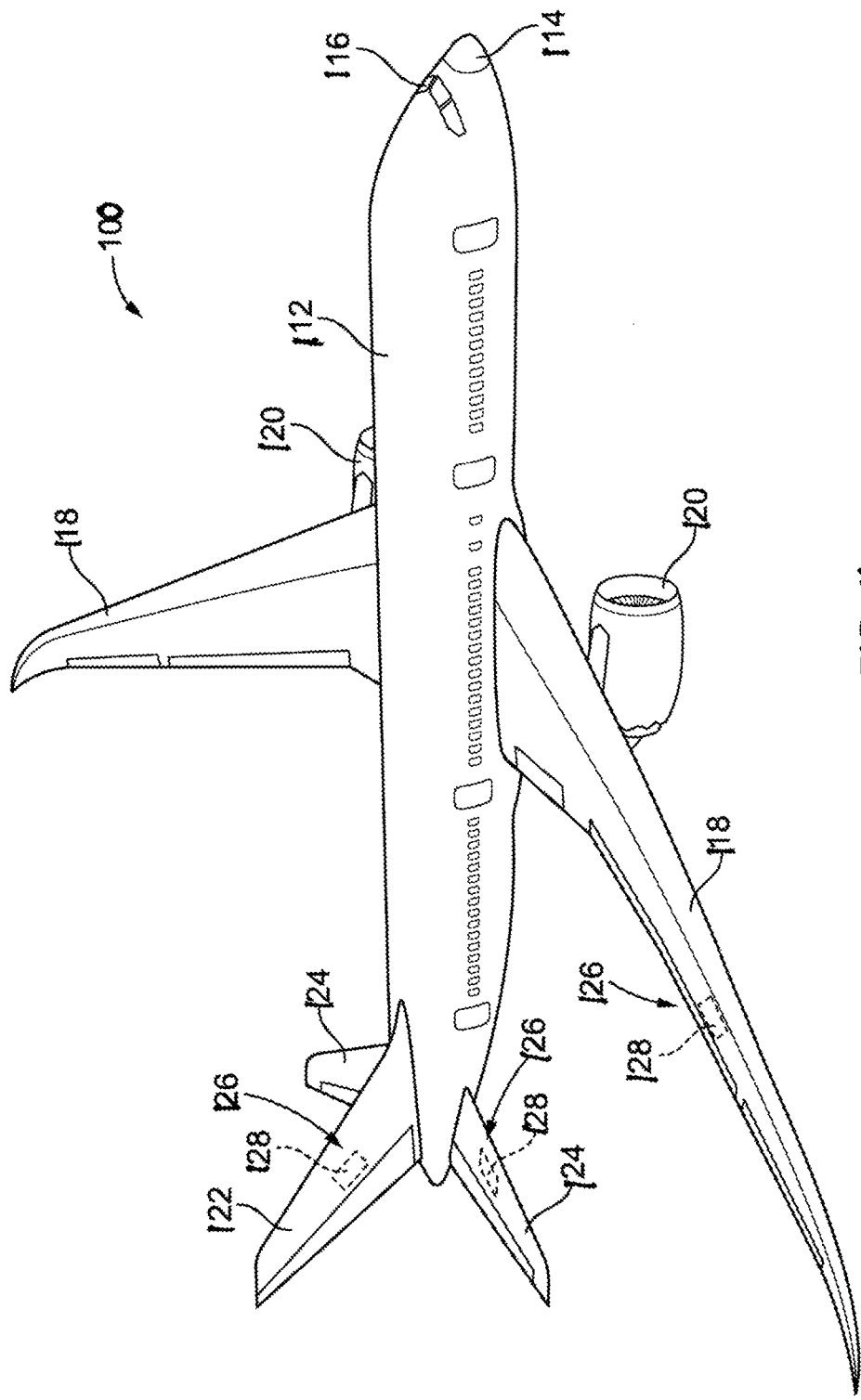
FIG. 11 is an illustration of a perspective view of an aircraft that may incorporate one or more composite laminates manufactured in accordance with one or more embodiments disclosed herein.

FIG. 11 is an illustration of a perspective view of an aircraft 100 that may incorporate one or more composite laminates manufactured by one of the embodiments of the present disclosure. As shown in FIG. 11, the aircraft 100 comprises a fuselage 112, a nose 114, a cockpit 116, wings 118 operatively coupled to the fuselage 120, one or more propulsion units 120, a tail vertical stabilizer 122, and one or more tail horizontal stabilizers 124. Although the aircraft 100 shown in FIG. 11 is generally representative of a commercial passenger aircraft, the one or more composite laminates, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles formed from or utilizing the composite laminates as disclosed herein.

Figure 12:
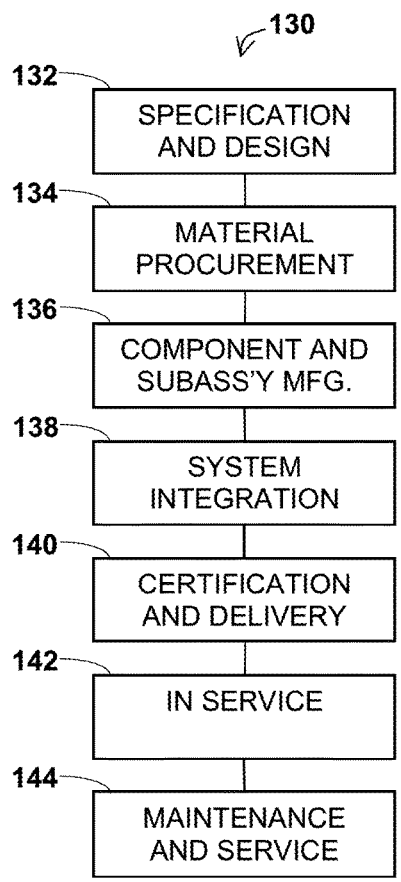
FIG. 12 is an illustration of a flow diagram of an embodiment of an aircraft production and service method of the disclosure.
Figure 13:
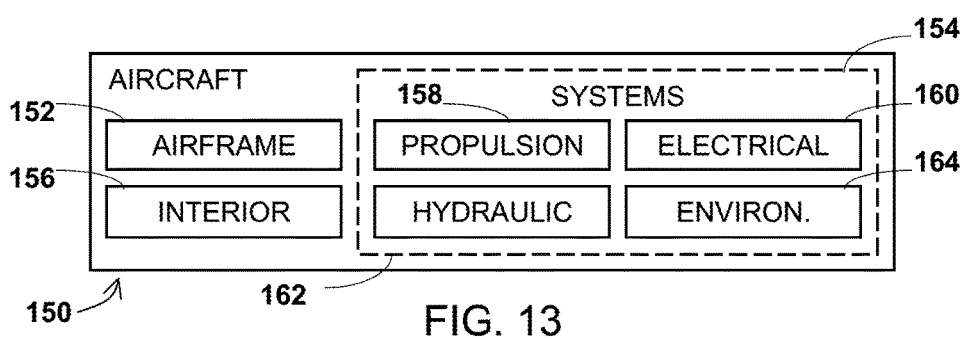
FIG. 13 is an illustration of a functional block diagram of an aircraft.

Embodiments of the disclosure may find use in a variety of potential applications, particularly in the transportation industry, including for example, aerospace, marine, automotive applications and other application where thermoplastic composite tubular structures may be used. Therefore, referring now to FIGS. 12 and 13, embodiments of the disclosure may be used in the context of an aircraft manufacturing and service method 130 as shown in FIG. 12 and an aircraft 150 as shown in FIG. 13. Aircraft applications of the disclosed embodiments may include, for example, without limitation, the design and fabrication of composite laminates fabricated by way of a releasable support as disclosed herein.

During pre-production, exemplary method 130 may include specification and design 132 of the aircraft 150 and material procurement 134. As just one example, for the specification and design of the aircraft related composite laminates, the type, the tackiness, and/or the geometrical properties of the conformable thin sheet 20 may be determined at this step. As just one example, at this step, it may be determined that the conformable thin sheet 20 comprises a latex rubber or other similar natural or synthetic deformable material. And where the thin sheet 20 comprises both a first and a second layer, at this step the composition and thickness of each of the first layer and the second layer may also be determined.

As another example, during this specification and design step, in one particular composite laminate arrangement, the thickness of the conformable thin sheet may be determined. In addition, during this specification and design step, the use of additional tackifiers may be selected so as to provide a desired adherence between a particular pre-cure laminate and the conformable sheet 20. As just another example, at this design step, it may be determined whether a second layer or ply of pre-cure lamina 40' is to be added directly to a first layer of pre-cure lamina 40 as discussed herein. As just another example, at this design step, it may be determined that additional layup assembly items may be required for a specific composite part, such as doublers, release films, and caul plates.

During production, component and subassembly manufacturing 136 and system integration 138 of the aircraft 150 takes place. As will be explained in greater detail above, FIGS. 1-10 illustrate one preferred type of process steps for fabricating composite laminate utilizing a releasable underlying support in accordance with one aspect of the present disclosure. After such a component and subassembly manufacturing step, the aircraft 150 may go through certification and delivery 140 in order to be placed in service 142. While in service by a customer, the aircraft 150 is scheduled for routine maintenance and service 144, which may also include modification, reconfiguration, refurbishment, and so on.

Each of the process steps of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 150 produced by exemplary method 130 may include an airframe 152 with a plurality of high-level systems 154 and an interior 156. Examples of high-level systems 154 may include one or more of a propulsion system 158, an electrical system 160, a hydraulic system 162, and an environmental system 164. Any number of other systems may be included. Although an aerospace example is shown, the principles of the disclosure may be applied to other industries, such as the marine and automotive industries.

Systems and methods embodied herein may be employed during any one or more of the stages of the production and service method 130. For example, components or subassemblies corresponding to production process may be fabricated or manufactured in a manner similar to components or subassemblies produced while the aircraft 150 is in service. Also, one or more apparatus embodiments, method embodiments, or a combination thereof may be utilized during the production stages 132 and 134, for example, by substantially expediting assembly of or reducing the cost of an aircraft 150. Similarly, one or more of apparatus embodiments, method embodiments, or a combination thereof may be utilized while the aircraft 150 is in service, for example and without limitation, to maintenance and service 144.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. A method of forming a releasable underlying support for use in preparing a composite laminate comprising,
    providing a base tool having a tooling surface and a perimeter edge;
    placing a conformable thin sheet on the tooling surface, where the thin sheet is configured with one high tack surface side and an opposite side having a non-tack surface that is in contact with the tooling surface;
    positioning the thin sheet over a vacuum source;
    sealing the thin sheet at or near the perimeter edge of the base tool; and
    drawing a vacuum to cause the non-tack surface side of the thin sheet to be drawn downward into contact with the tooling surface.

2. The method of claim 1 further comprising the step of adding a first layer of pre-cure lamina to the high tack surface side to form a composite laminate.

3. The method of claim 2 further comprising the step of adding one or more subsequent layers of pre-cure lamina to the first layer to form a composite laminate.

4. The method of claim 2 further comprising the steps of
    stopping the vacuum;
    removing the seal from the thin sheet;
    removing the composite laminate and attached thin sheet from the base tool; and
    removing the thin sheet from the composite laminate.

5. The method of claim 4 where the composite laminate is transferred to a curing tool.

6. The method of claim 5 where the composite laminate and curing tool are placed in a curing device to cure the composite laminate.

7. The method of claim 4 further comprising reusing the thin sheet to prepare a second composite laminate using the base tool.

8. The method of claim 2 further characterized in that the first layer of pre-cure lamina is formed by,
    applying a composite pre-preg over a deformable carrier film; and
    deforming the composite pre-preg by stretching the deformable carrier film, stretching comprising changing one of a length or a width of the deformable carrier film.

9. The method of claim 8 further characterized in that the deformable carrier film is used to transport and position the composite pre-preg over the high tack surface side of the thin sheet.

10. The method of claim 9 further comprising removing the deformable carrier film before adding a second layer of pre-cure lamina to the first layer.

11. The method of claim 8, wherein the composite pre-preg is placed on the deformable carrier film so as to leave one or more edge margins on the deformable carrier film around the composite pre-preg.

12. A method of forming a composite laminate comprising,
providing a base tool having a tooling surface and a perimeter edge;
placing a conformable thin sheet on the tooling surface, where the thin sheet includes a latex layer, the thin sheet configured with one high tack surface side and an opposite side having a non-tack surface in contact with the tooling surface;
positioning the thin sheet over a vacuum source;
sealing the thin sheet at or near the perimeter edge of the tool; and
drawing a vacuum to cause the non-tack surface side of the sheet to be drawn downward into contact with the tooling surface.

13. The method of claim 12 including the further steps of:
adding a first layer of pre-cure lamina to the high tack surface side;
adding one or more subsequent layers of pre-cure lamina to the first layer to form a composite laminate;
stopping the vacuum;
removing the seal from the thin sheet;
removing the composite laminate and attached thin sheet from the base tool; and
removing the thin sheet from the composite laminate.

14. The method of claim 13 where the composite laminate is transferred to a curing tool.

15. The method of claim 14 where the composite laminate and curing tool are placed in a curing device to cure the composite laminate.

16. The method of claim 13 further characterized in that the first layer of pre-cure lamina is formed by,
applying a composite pre-preg over a deformable carrier film; and
deforming the composite pre-preg by stretching the deformable carrier film, stretching comprising changing one of a length or a width of the deformable carrier film.

17. The method of claim 16 further characterized in that the deformable carrier film is used to transport and position the composite pre-preg over the high tack surface side of the thin sheet.

18. The method of claim 17 further comprising removing the deformable carrier film before adding a second layer of pre-cure lamina to the first layer.

19. The method of claim 16, wherein the composite pre-preg is placed on the deformable carrier film so as to leave one or more edge margins on the deformable carrier film around the composite pre-preg.

20. The method of claim 19 wherein the one or more edge margins facilitate at least one of handling of the deformable carrier film and attachment of hardware or equipment to the deformable carrier film.

21. The method of claim 16, wherein deforming the composite pre-preg includes stretching the deformable carrier film in a direction traverse to an orientation of fibers in the composite pre-preg.

22. The method of claim 12 further comprising reusing the thin sheet to prepare a second composite laminate using the base tool.

* * * * *